(12) United States Patent
Beri et al.

(10) Patent No.: US 9,761,043 B1
(45) Date of Patent: Sep. 12, 2017

(54) NON-MULTISAMPLED ANTI-ALIASING FOR CLIPPING PATHS

(71) Applicant: ADOBE SYSTEMS INCORPORATED, San Jose, CA (US)

(72) Inventors: Tarun Beri, Uttar Pradesh (IN); Vineet Batra, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/162,123

(22) Filed: May 23, 2016

(51) Int. Cl.
*G06T 15/30* (2011.01)
*G06T 15/04* (2011.01)
*G06T 17/20* (2006.01)
*G06T 15/00* (2011.01)

(52) U.S. Cl.
CPC ............ *G06T 15/30* (2013.01); *G06T 15/005* (2013.01); *G06T 15/04* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 6,614,449 B1 * | 9/2003 | Morein | ................... | G06T 11/40 345/555 |
| 7,847,798 B1 * | 12/2010 | Parenteau | ............. | G06T 15/405 345/422 |
| 2006/0197768 A1 * | 9/2006 | Van Hook | ............. | G06T 15/005 345/546 |
| 2011/0285711 A1 * | 11/2011 | Kilgard | ................. | G06T 11/203 345/426 |
| 2016/0180551 A1 * | 6/2016 | Wendt | ................... | G06T 11/001 345/611 |

* cited by examiner

*Primary Examiner* — Maurice L McDowell, Jr.
(74) *Attorney, Agent, or Firm* — Shook, Hardy & Bacon L.L.P.

(57) ABSTRACT

Systems and methods provide for non-multisampled anti-aliasing for clipping paths, in which a non-multisampled texture is employed to store anti-aliasing data. In some configurations, clipping paths applied to an input object are processed successively using a non-multi-sampled buffer and non-multisampled texture. Each clipping path is processed by incrementing a stencil buffer value for each pixel covered by the clipping path, computing clipping path coverage data, and storing the clipping path coverage data in the non-multisampled texture. An object is rendered by performing a stencil test and multiplying color values for retained pixels by corresponding texture values from the non-multisampled texture to provide anti-aliasing. Further configurations operate without a stencil buffer but employ a logical stack of non-multisampled textures, one for each clipping path.

20 Claims, 7 Drawing Sheets

NON-MULTISAMPLED ANTI-ALIASING FOR CLIPPING PATHS

BACKGROUND

Clipping paths are used by many image/vector editing applications to cut out objects from input objects (e.g., images, vectors, Bezier paths, gradients, patterns, etc.). When a clipping path is applied to an input object, any portion of the input object within the clipping path is included while any portion of the input object outside the clipping path is excluded (or vice versa). For instance, clipping paths can be used on an image of a product to remove the background surrounding the product and thereby provide an image of the product by itself.

Clipping paths can result in aliased renderings in which clipped objects have jagged edges. To address this issue, anti-aliasing is often used to smooth out the appearance of edges from clipping paths. Traditional GPU-based techniques used for anti-aliasing rely on multisample anti-aliasing (MSAA). MSAA uses a multisampled color buffer in conjunction with a multisampled stencil buffer to achieve the desired clipping effect. However, this approach has memory and performance implications making the technique inefficient in rendering complicated artwork. In particular, MSAA is dependent upon multisampling, which means that every pixel is treated as "N" subpixels ("N" being the multisampling factor). This effectively increases the storage requirement for the entire screen (and any associated textures/buffers like stencil and depth buffers) by "N" times. The pixels to be processed may also grow "N" times, which drastically decreases rendering performance. The problem is further complicated when an input object includes multiple clipping paths that must be processed. In some instances, the memory and performance issues from MSAA prevent some complicated artworks from being rendered (especially when the underlying color space is CMYK or N-Channel, which inherently need more memory than RGB).

SUMMARY

Embodiments of the present invention relate to, among other things, anti-aliased rendering of objects from clipping paths that does not rely on multisampling. By not using multisampling, techniques described herein reduce memory requirements and improve performance when compared to MSAA. In accordance with some configurations, anti-aliasing is achieved using a non-multisampled stencil buffer and non-multisampled texture. Clipping paths applied to an input object are processed successively. For each clipping path, a stencil value in the non-multisampled stencil buffer is incremented for pixels covered at least partially by the current clipping path. Additionally, a clipping path coverage value is computed for each pixel for the current clipping path based on an extent to which the clipping path covers each pixel. A texture value in the non-multisampled texture for each pixel is updated by multiplying the texture value for each pixel by the clipping path coverage value for each pixel for the current clipping path. When drawing an object, a stencil test is performed such that only pixels whose stencil value equals a count of the current clipping value are retained, and the color value for each retained pixel is multiplied by a corresponding texture value in the non-multisampled texture to thereby provide anti-aliasing. Further configurations provide anti-aliased rendering without use of a stencil buffer. In such configurations, a logical stack of non-multisampled textures is used to store anti-aliasing data.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
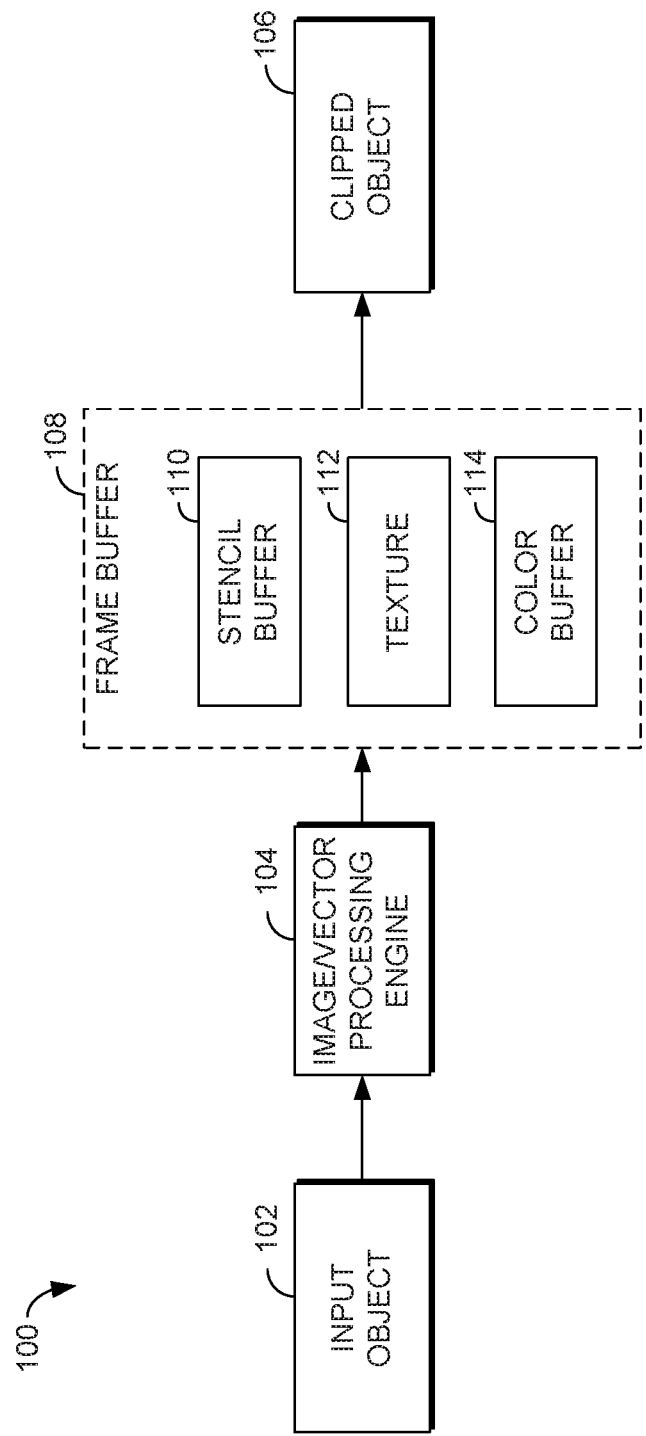
FIG. 1 is a block diagram illustrating an exemplary system in accordance with some implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention address the technical challenge of anti-aliased rendering of clipping paths by providing an approach that does not rely on multisampling. As used herein, a "clipping path" is a closed shape or path used to cut out an object from an input object, such as a path drawn around a portion of an image to thereby cut out that portion from the image. As used herein, "objects refer to images, vectors, Bezier paths, gradients, patterns, or other mechanisms used to generate a rendering for display. Because multisampling is not employed, the techniques described herein consume much less memory and provide improved performance when compared with MSAA. Generally, some configurations herein provide anti-aliased rendering of multiple clipping paths on an input object by using a non-multisampled frame buffer with a non-multisampled stencil buffer for storing depth of clipping path nesting and a non-multisampled texture for storing anti-aliasing values for pixels. As used herein, a "frame buffer" refers to a portion of memory (e.g., on a graphics processing unit (GPU)) that stores pixel data used for rendering an image on a display device. A "stencil buffer" refers to a portion of memory that stores data on a per-pixel basis to limit the area of rendering. For instance, based on stencil buffer values, some pixels are rendered while other pixels are not rendered. A "texture" refers to a portion of memory used to store image data on a per-pixel basis using a single image format. The frame buffer, stencil buffer, and texture are non-multisampled in that each pixel is treated as a single unit and not divided into subpixels.

More particularly, to process clipping paths for an input object, some embodiments create a non-multisampled frame buffer with a non-multisampled stencil buffer and non-multisampled texture by allocating a portion of memory for each. The clipping paths are successively processed with each clipping path being processed as follows. The non-multisampled texture is set as the output color attachment for the non-multisampled frame buffer such that pixel values derived from rendering the current clipping path are written to the non-multisampled texture. The rendering includes incrementing a stencil buffer value in the non-multisampled stencil buffer for each pixel of the input object covered at least partially by the current clipping path. Additionally, a clipping path coverage value is computed for each pixel, and a texture value in the non-multisampled texture for each pixel is updated by multiplying the texture value for each pixel by the clipping path coverage value determined for each respective pixel. This provides an anti-aliasing value for each pixel for the current clipping path and each previously processed clipping path. Objects are drawn by restoring the color buffer as the output color attachment for the non-multisampled frame buffer, discarding pixels whose stencil value does not equal the count of the current clipping path, and drawing remaining pixels by multiplying each remaining pixel's color value by a corresponding texture value in the non-multisampled texture. As used herein, a "color buffer" refers to a portion of memory used to store a color value on a per-pixel basis. A "color value" corresponds with data used to control the color of a pixel on a display screen when outputting a displayed rendering of an object.

Further configurations described herein provide another technique for rendering anti-aliased clipping paths that does not rely on multisampling and also does not use a stencil buffer. Generally, such embodiments use a logical stack of textures, one for each level of nested clipping path, to store anti-aliasing values for each level of clipping path. More particularly, the clipping paths are successively processed with each clipping path processed as follows. A non-multisampled texture is set as a current texture for the current clipping path, and the current texture is set as the output color attachment for a non-multisampled frame buffer. The current clipping path is rendered to the current texture, which includes determining a clipping path coverage value for each pixel and writing that value to the current texture. The clipping path coverage values from the current texture for each pixel are multiplied by texture values in a previous texture used to store clipping path coverage values for pixels from previously processed clipping paths. The resulting texture values are then stored in the current texture. This provides an anti-aliasing value for each pixel for the current clipping path and each previously processed clipping path.

It should be understood that there are various permutations of textures and other memory buffers that can be used in accordance with embodiments of the present invention. Objects are drawn by restoring the color buffer as the output color attachment for the non-multisampled frame buffer, and drawing pixels by multiplying each pixel's color value by a corresponding texture value in the current texture.

With reference now to the drawings, FIG. 1 is a block diagram illustrating an exemplary system 100 for anti-aliased rendering of objects using clipping paths without relying on multisampling in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components, the system 100 includes an image/vector processing engine 104 that processes clipping paths applied to input object 102 to provide a clipped object 106. As shown in FIG. 1, the image/vector processing engine 104 employs a frame buffer 108 with a stencil buffer 110, texture 112, and color buffer 114 in rendering the clipped object 106 from the input object 102. The frame buffer 108, stencil buffer 110, texture 112, and color buffer 114 are non-multisampled, such that each pixel is treated as a single unit and not divided into subpixels. Although not shown in FIG. 1, it should be understood that the frame buffer 108 may include additional components (e.g., a depth buffer).

The image/vector processing engine 104 successively processes each of a number of clipping paths applied to the input object 102, for instance, using the method 200 described below with reference to FIG. 2. For a given clipping path, the image/vector processing engine 104 sets the texture 112 as the output color attachment for the frame buffer 108. This allows for anti-aliasing data to be written to the texture 112. In particular, the image/vector processing engine 104 tessellates the current clipping path into triangles, and the triangles are written to the frame buffer 108. As known in the art, tessellating decomposes an area of an object by dividing into it into a set of triangles suitable for rendering. A current stencil value in the stencil buffer 110 is incremented for each pixel at least partially covered by the triangles. Additionally, a clipping path coverage value is computed for each pixel based on the extent to which the triangles cover each pixel, and a current texture value in the texture 112 is multiplied by the clipping path coverage value for each pixel. The current texture value in the texture 112 for each pixel can be a value of one when the initial clipping path is being processed or can be a value resulting from the multiplication of clipping path coverage values from previously-processed clipping paths when a subsequent clipping path is being processed. The clipping path coverage value can be computed using any of a variety of known techniques. For instance, the clipping path coverage value for a pixel can be computed using the technique described in Loop, C., and Blinn, J., 2005, Resolution Independent Curve Rendering using Programmable Graphics Hardware, ACM Transactions on Graphics (TOG)—Proceedings of ACM SIGGRAPH 2005, Volume 24 Issue 3, July 2005, Pages 1000-1009 (available online at http://research.microsoft-.com/en-us/um/people/cloop/LoopBlinn05.pdf). It should be understood that other known approaches for computing clipping path coverage are available and can be used within embodiments of the present invention.

Objects at the level of the current clipping path (i.e., objects under the current clipping path in conjunction with any previous clipping paths) are drawn by returning the color buffer 114 as the output color attachment for the frame buffer 108. A stencil test is used to identify pixels covered by each of the clipping paths processed at the current level. In particular, pixels with a stencil buffer value equal to the count of the current clipping path are retained. For instance, if the current clipping path is the third clipping path processed, only pixels whose stencil buffer value is equal to three are retained as selected pixels. This captures pixels that are covered by all three clipping paths. To draw the objects, the color value for each selected pixel passing the stencil test is multiplied by a respective texture value in the texture 112 for each pixel. This multiplication provides the desired anti-aliasing effect. The resulting values are written to the color buffer 114, and a clipped object 106 is output for display.

Figure 2:
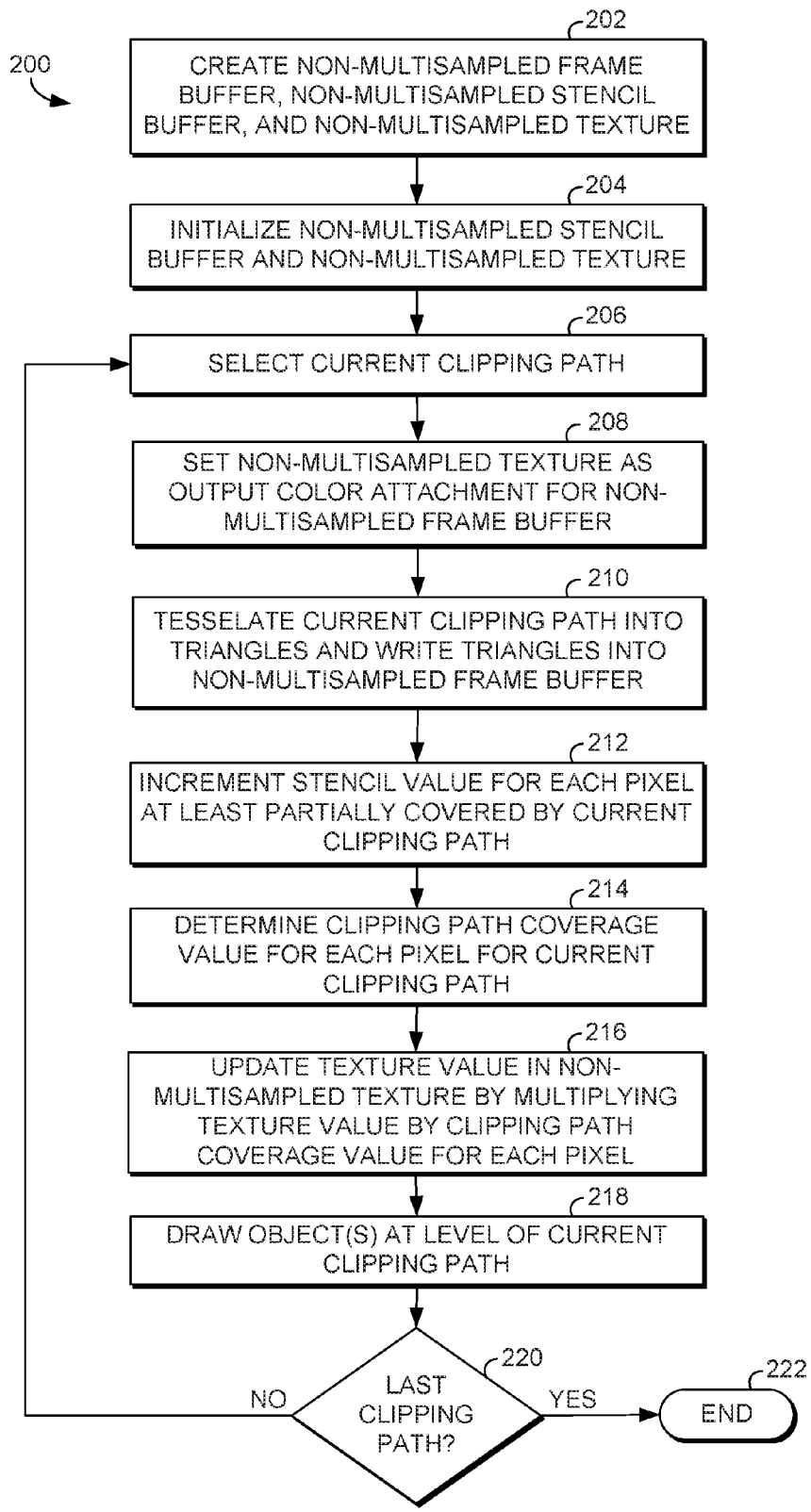
FIG. 2 is a flow diagram showing a method for providing anti-aliased rendering for a group of clipping paths without multisampling in accordance with some implementations of the present disclosure.

With reference now to FIG. 2, a flow diagram is provided illustrating a method 200 for providing anti-aliased rendering for a group of clipping paths without multisampling. Each block of the method 200 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method 200 may be performed at least in part, for instance, by the image/vector processing engine 104 of FIG. 1.

As shown at block 202, a non-multisampled frame buffer, a non-multisampled stencil buffer, and a non-multisampled texture are created. The non-multisampled texture could be in GL_R16F format, for instance, with every pixel in the texture taking two bytes. The non-multisampled stencil buffer includes a stencil value for each pixel, and the non-multisampled texture includes a texture value for each pixel. As shown at block 204, the stencil values in the non-multisampled stencil buffer are initialized with zeroes. Additionally, the texture values in the non-multisampled texture are initialized with ones. In other configurations, this initialization can be optimized away. For instance, as discussed below, if the non-multisampled texture is not initialized with all ones, a first pass replaces texture values in the non-multisampled texture as opposed to using a multiplication function.

An initial clipping path is selected and set as a current clipping path for processing, as shown at block 206. The non-multisampled texture is set as the output color attachment for the non-multisampled frame buffer, as shown at block 208. This allows for anti-aliasing data to be written to the non-multisampled texture (a color buffer is not needed at this time, so the non-multisampled texture is temporarily put in place of the color buffer). The current clipping path is tessellated into triangles, and the triangles are written to the non-multisampled frame buffer, as shown at block 210. A current stencil value in the non-multisampled stencil buffer is incremented by one for each pixel covered at least partially by an area defined by the current clipping path, as shown at block 212. Additionally, a clipping path coverage value is determined for each pixel for the current clipping path, as shown at block 214. The clipping path coverage value for a given pixel represents an extent to which the clipping path covers the given pixel. As noted previously, the clipping path coverage value can be computed using any of a variety of known techniques.

As shown at block 216, a current texture value in the non-multisampled texture for each pixel is multiplied by the clipping path coverage value determined for each respective pixel. In some embodiments, if the current clipping path being processed is the initial clipping path and if the texture was not initialized to all ones at block 204, the current texture value in the non-multisampled texture for each pixel is overwritten with the clipping path coverage value determined for each respective pixel as opposed to using a multiplication function. This works because all subsequent/nested clipping paths are installed only at those pixels where stencil test passes.

Figure 3:
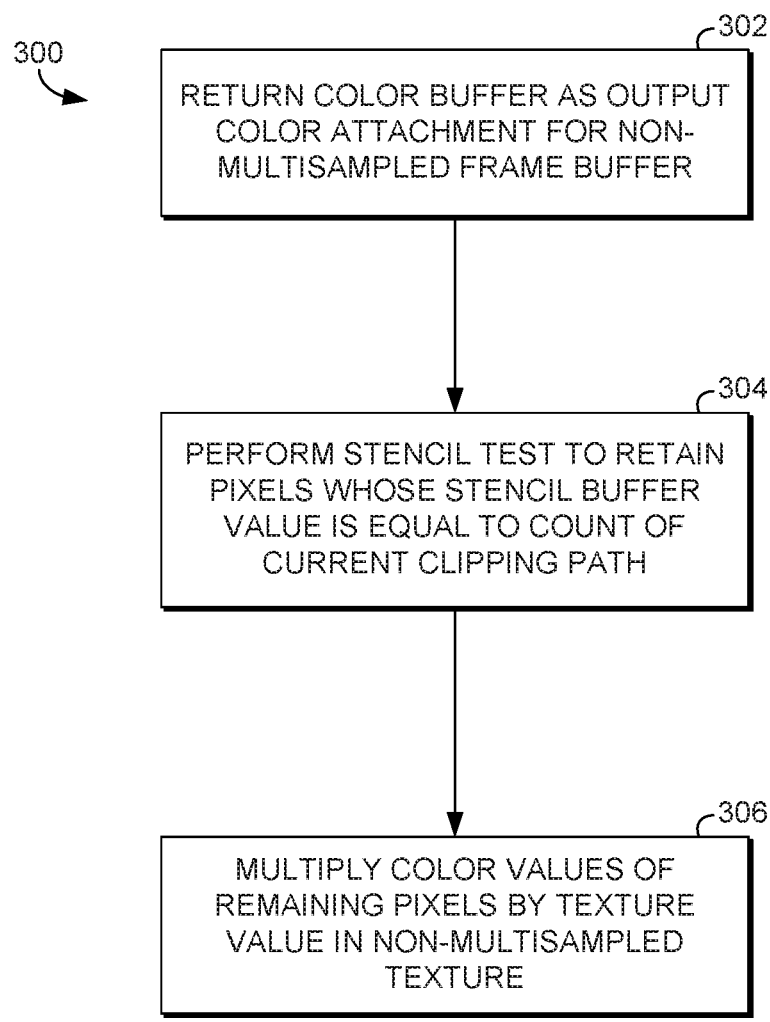
FIG. 3 is a flow diagram showing a method for drawing clipped objects in accordance with some implementations of the present disclosure.

Objects at the level of the current clipping path (i.e., objects under the current clipping path in conjunction with any previous clipping paths) are drawn at block 218. In some configurations, the objects are drawn using the method 300 shown in FIG. 3. The process includes returning the color buffer as the output color attachment for the non-multisampled frame buffer, as shown at block 302. A stencil test is performed to retain selected pixels whose stencil buffer value is equal to the count of the current clipping path, as shown at block 304. To draw the objects, the color value for each selected pixel passing the stencil test is multiplied by a respective texture value in the non-multisampled texture for each pixel, as shown at block 306. This multiplication provides the desired anti-aliasing effect.

Returning to FIG. 2, a determination is made at block 220 regarding whether the current clipping path is the last clipping path. If it is determined that the current clipping path is not the last clipping path, a next clipping path is selected and processed using the approach of blocks 206 through 218 as shown by the return to block 206. Alternatively, if it is determined that the current clipping path is the last clipping path, the process ends, as shown at block 222.

The above process of drawing objects for clipping paths using the non-multisampled frame buffer, non-multisampled stencil buffer, and non-multisampled texture can be performed using the OpenGL calls provided below. While OpenGL calls are provided herein, it should be understood that the calls are provided by way of example only and not limitation. Any of a variety of alternatives to OpenGL can be employed to implement embodiments of the present invention (e.g., DirectX, Mantle, Vulkan, Metal, etc.).

glColorMask(true, false, false, false)
glStencilOp(GL_KEEP, GL_KEEP, GL_INCR)
glStencilFunc(GL_EQUAL, i–1, 0xFF)
glBlendFunc(GL_ZERO, GL_SRC_COLOR)
Run OpenGL shader to install clip path 'i'
glStencilFunc(GL_GEQUAL, i, 0xFF)
glStencilOp(GL_KEEP, GL_KEEP, GL_KEEP)
glColorMask(true, true, true, true)

Figure 4:
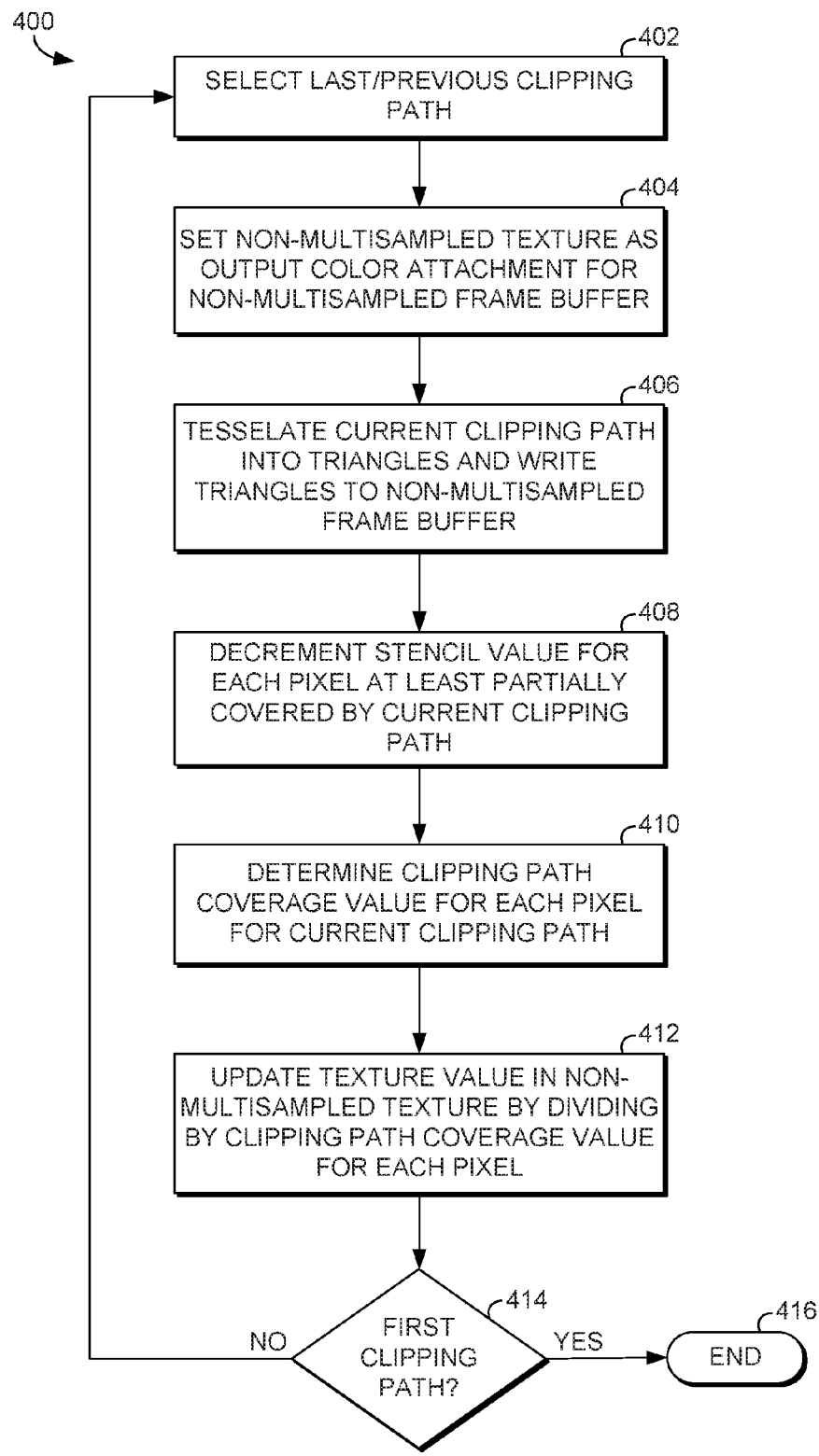
FIG. 4 is a flow diagram showing a method for uninstalling clipping paths in accordance with some implementations of the present disclosure.

Turning now to FIG. 4, a flow diagram is provided that illustrates a method for uninstalling clipping paths. As shown at block 402, the last/previous clipping path processed when installing the clipping paths is selected. When the process begins, the last clipping path is selected, while subsequent loops process previous clipping paths until the first clipping path is processed. As shown at block 404, the non-multisampled texture is set as the output color attachment for the non-multisampled frame buffer.

The current clipping path is tessellated into triangles, and the triangles are written to the non-multisampled frame buffer, as shown at block 406. A current stencil value in the non-multisampled stencil buffer is decremented by one for each pixel covered at least partially by an area defined by the current clipping path, as shown at block 408. Additionally, a clipping path coverage value is determined for each pixel for the current clipping path, as shown at block 410. As noted above, the clipping path coverage value for a given pixel can be computed using any of a variety of known techniques.

As shown at block 412, a current texture value in the non-multisampled texture for each pixel is divided by the clipping path coverage value determined for each respective pixel. The division can be obtained, for instance, by computing the reciprocal of the clipping path coverage value in a fragment shader and multiplying the current texture value in the non-multisampled texture with the reciprocal (e.g., the glBlendFunc call in OpenGL can perform this multiplication using blend hardware).

A determination is made at block 414 regarding whether the current clipping path is the first clipping path originally installed. If it is determined that the current clipping path is not the first clipping path, a previous clipping path is selected and processed using the approach of blocks 402 through 412, as shown by the return to block 402. Alternatively, if it is determined that the current clipping path is the first clipping path, the process ends, as shown at block 416.

Figure 5:
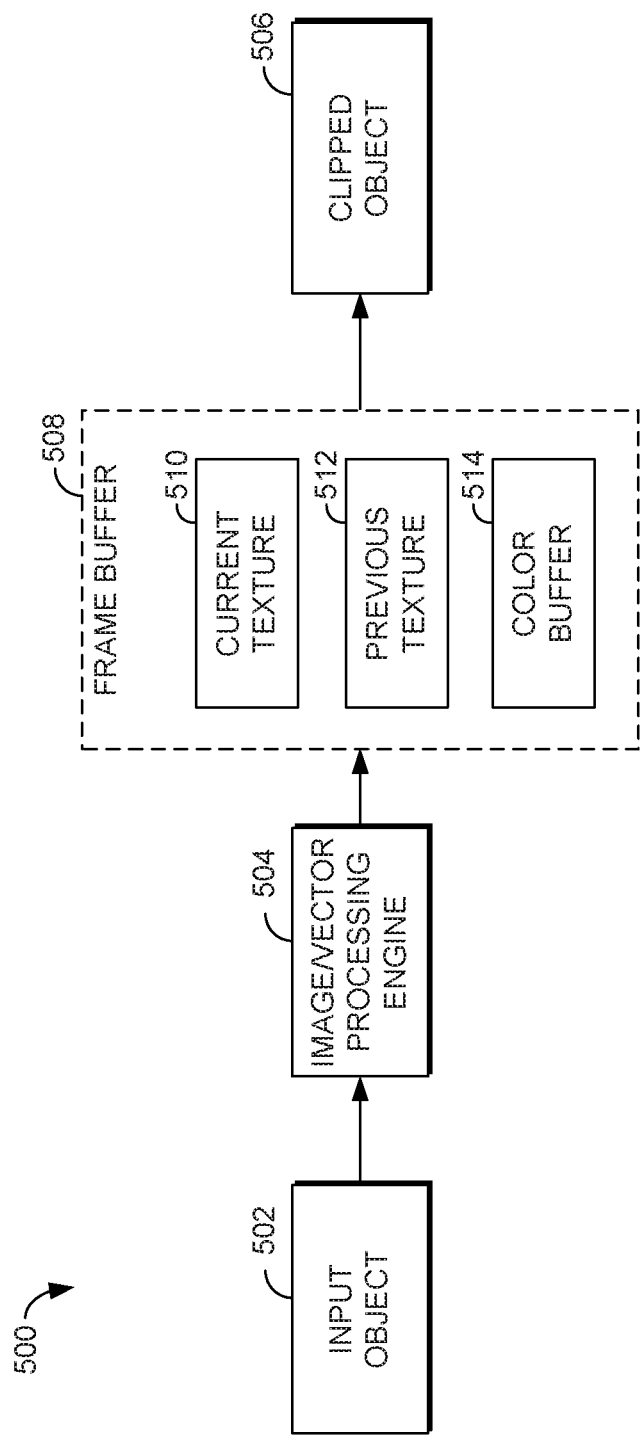
FIG. 5 is a block diagram illustrating another exemplary system in accordance with some further implementations of the present disclosure.

As previously noted, further embodiments are directed to processing clipping paths without relying on multisampling and without use of a stencil buffer. FIG. 5 illustrates a system 500 for rendering clipped objects in accordance with such embodiments. Among other components not shown, the system 500 includes an image/vector processing engine 504 that processes clipping paths applied to input object 502 to provide a clipped object 506. As shown in FIG. 5, the image/vector processing engine 504 employs a frame buffer 508 with multiple textures 510, 512 and a color buffer 514 in rendering the clipped object 506 from the input object 502. The frame buffer 508, textures 510, 512, and color buffer 514 are non-multisampled, such that each pixel is treated as a single unit and not divided into subpixels. Although not shown in FIG. 5, it should be understood that the frame buffer 508 may include additional components (e.g., a depth buffer).

The image/vector processing engine 504 successively processes each of a number of clipping paths applied to the input object 502, for instance, using the method 600 described below with reference to FIG. 6. For a given clipping path, the image/vector processing engine 504 sets a current texture 510 as the output color attachment for the frame buffer 508. The image/vector processing engine 504 renders the current clipping path by tessellating the clipping path into triangles and writing the triangles to the frame buffer 508. A clipping path coverage value is determined for each pixel for the current clipping path and written to the current texture 510. As noted previously, the clipping path coverage value for a given pixel represents an extent to which the triangles cover the pixel and can be computed using any of a variety of known techniques.

If the current clipping path is not the first clipping path, the texture value for each pixel in the current texture 510 is multiplied by a texture value for each pixel in the previous texture 512. The previous texture 512 stores path coverage data computed for each previously processed clipping path. The resulting value from the multiplication is stored in the current texture 510. As such, the current texture includes anti-aliasing data for each pixel based on all clipping paths that have been processed at the current level. When a subsequent clipping path is processed, the current texture 510 is set as the previous texture 512, and a new texture is used as the current texture for that clipping path.

Objects at the level of the current clipping path (i.e., objects under the current clipping path in conjunction with any previous clipping paths) are drawn by returning the color buffer 514 as the output color attachment for the frame buffer 508. To draw the objects, the color value for each pixel is multiplied by a respective texture value in the current texture 512 for each pixel. This multiplication provides the desired anti-aliasing effect. The resulting values are written to the color buffer 514, and a clipped object 506 is output for display.

Figure 6:
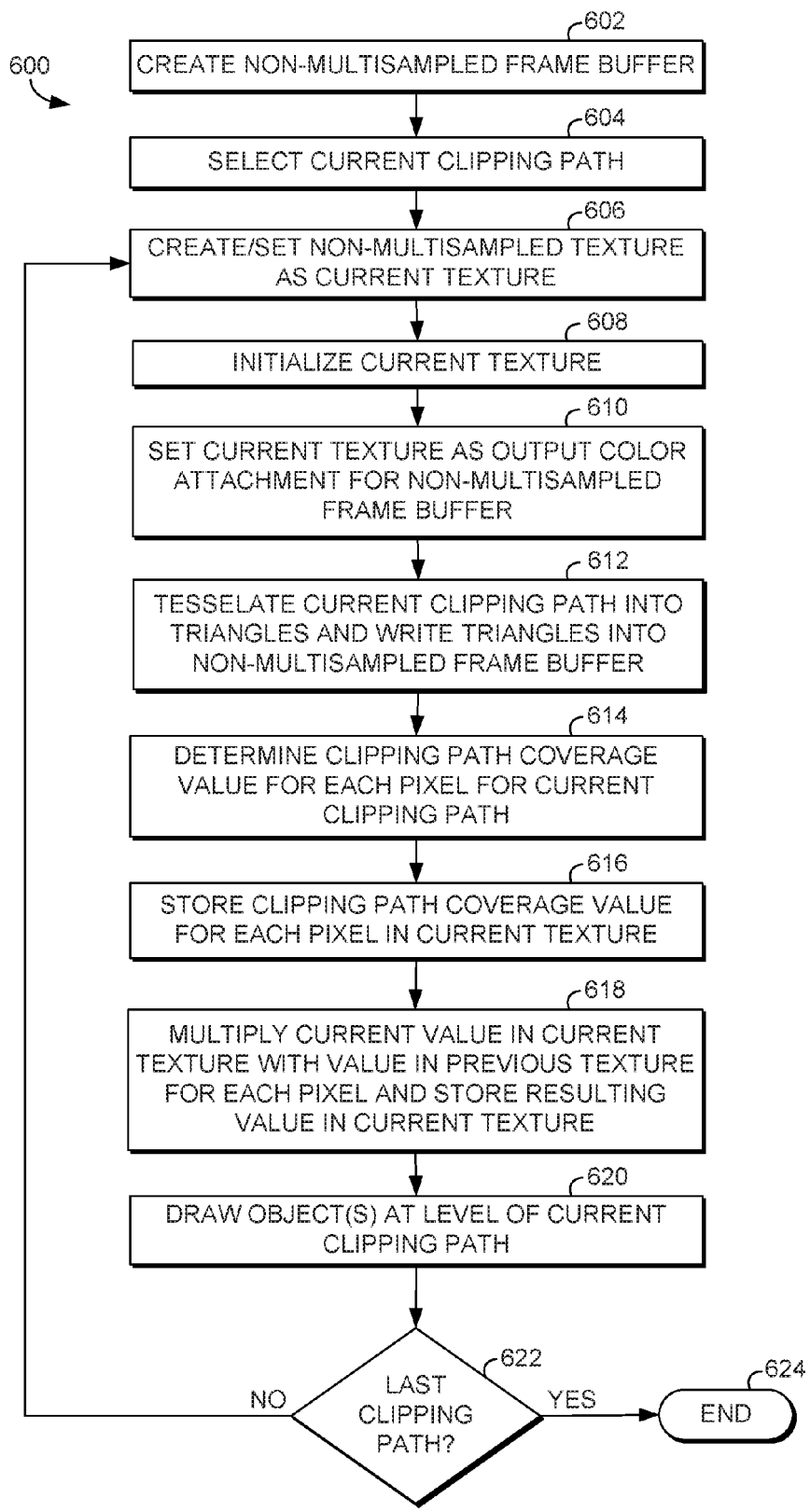
FIG. 6 is a flow diagram showing a method for providing anti-aliased rendering for a group of clipping paths without multisampling and without use of a stencil buffer in accordance with implementations of the present disclosure.

Turning now to FIG. 6, a flow diagram is provided that illustrates a method 600 for providing anti-aliased rendering for a group of clipping paths without multisampling and without use of a stencil buffer. As shown at block 602, a non-multisampled frame buffer is created. A clipping path is selected as the current clipping path, as shown at block 604. Additionally, a non-multisampled texture is created and set as the current texture, as shown at block 606. In some configurations, the texture values of the current texture are initialized with zeroes, as shown at block 608. The current clipping path is rendered into the current texture. In some configurations, this is done by initially setting the current texture as the output color attachment for the non-multisampled frame buffer, as shown at block 610. The current clipping path is tessellated into triangles, and the triangles are written to the non-multisampled frame buffer, as shown at block 612. A clipping path coverage value is determined for each pixel for the current clipping path, as shown at block 614. As noted above, the clipping path coverage value for a given pixel can be computed using any of a variety of known techniques. The clipping path value for each pixel is stored in the current texture, as shown at block 616.

If the current clipping path is not the first clipping path, the texture value for each pixel in the current texture is multiplied by a texture value for each pixel in the previous texture, and the resulting value is stored in the current texture, as shown at block 618. The previous texture stores texture values computed from previously processed clipping paths. One way of achieving this multiplication is using a blend function as glBlendFunc(GL_ZERO, GL_SRC_ALPHA).

Objects at the level of the current clipping path are drawn at block 620. In some configurations, this includes returning the color buffer as the output color attachment for the non-multisampled frame buffer. To draw the objects, the color value for each pixel is multiplied by a respective texture value in the current texture for each pixel. This multiplication provides the desired anti-aliasing effect. After artwork is drawn, textures can be deleted or recycled.

A determination is made at block 622 regarding whether the current clipping path is the last clipping path. If it is determined that the current clipping path is not the last clipping path, a next clipping path is selected and processed using the approach of blocks 604 through 620 as shown by the return to block 606. Alternatively, if it is determined that the current clipping path is the last clipping path, the process ends, as shown at block 624.

Figure 7:
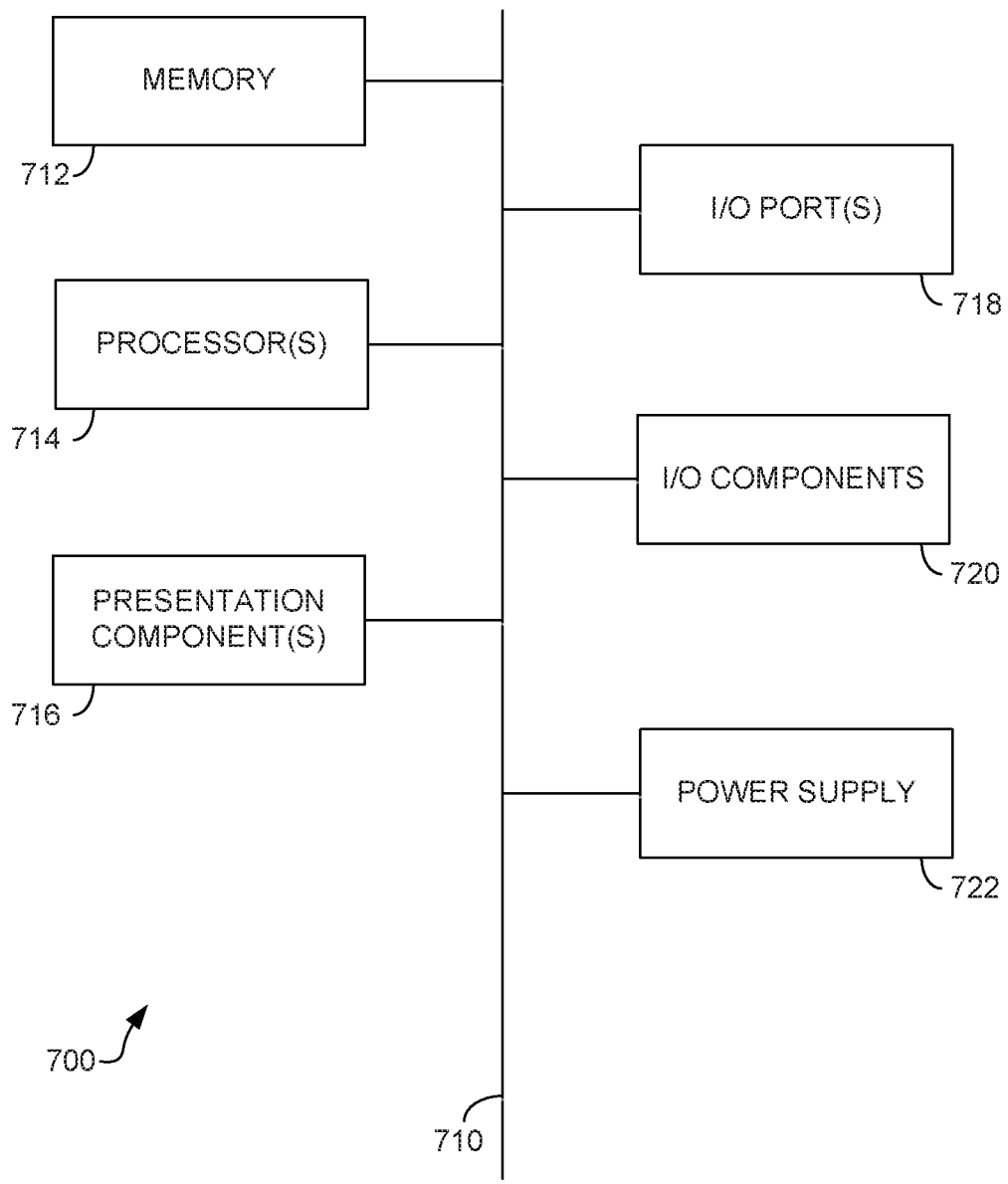
FIG. 7 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714 (e.g., CPU, GPU, etc.), one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

As described above, implementations of the present disclosure relate to anti-aliased rendering of clipping paths without relying on multisampling. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for anti-aliased rendering of an object clipped from an input object using a plurality of clipping paths, the method comprising:
creating a non-multisampled stencil buffer, and a non-multisampled texture, the non-multisampled stencil buffer comprising a stencil value for each of a plurality of pixels for the input object, the non-multisampled texture comprising a texture value for each of the plurality of pixels;
successively performing for each clipping path:
selecting a current clipping path;
incrementing the stencil value in the non-multisampled stencil buffer for each pixel covered at least partially by an area defined by the current clipping path;
determining a clipping path coverage value for each pixel for the current clipping path;
updating the texture value in the non-multisampled texture for each pixel by multiplying the texture value by the clipping path coverage value for each pixel; and
drawing the object by:
identifying pixels to draw by using a stencil test to identify pixels whose stencil value in the non-multisampled stencil buffer is equal to a count of the current clipping path, and
multiplying a color value for each identified pixel by the texture value in the non-multisampled texture corresponding to each identified pixel.

2. The method of claim 1, wherein the method further comprises initializing the stencil values in the non-multisampled stencil buffer with all zeros.

3. The method of claim 1, wherein the method further comprises initializing the texture values in the non-multisampled texture with all ones.

4. The method of claim 1, wherein the method further comprises uninstalling the plurality of clipping paths by:
successively performing for each clipping path starting with a last clipping path processed:
selecting a current clipping path to uninstall;
setting the non-multisampled texture as the output color attachment for a non-multisampled frame buffer;
tessellating the current clipping path to uninstall into triangles and writing the triangles to the non-multisampled frame buffer;
decrementing the stencil value in the non-multisampled stencil buffer for each pixel covered at least partially by an area defined by the current clipping path to uninstall;
determining a clipping path coverage value for each pixel for the current clipping path to uninstall; and
dividing the texture value in the non-multisampled texture by the clipping path coverage value for each pixel for the current clipping path to uninstall.

5. The method of claim 4, wherein dividing the texture value in the non-multisampled texture by the clipping path coverage value for each pixel comprises:
computing a reciprocal of the clipping path coverage value for each pixel in a fragment shader; and
multiplying the texture value in the non-multisampled texture with the reciprocal value for each pixel.

6. One or more computer storage media storing computer-useable instructions that, when executed by a computing device, cause the computing device to perform operations, the operations comprising:
successively processing each of a plurality of clipping paths using a non-multisampled stencil buffer, and a non-multisampled texture, the non-multisampled stencil buffer comprising a stencil value for each of a plurality of pixels, the non-multisampled texture comprising a texture value for each of the plurality of pixels, wherein processing for a selected clipping path from the plurality of clipping paths includes:
incrementing the stencil value in the non-multisampled stencil buffer for each pixel covered at least partially by an area defined by the selected clipping path;
determining a clipping path coverage value for each pixel for the selected clipping path;
updating the texture value in the non-multisampled texture for each pixel by multiplying the texture value by the clipping path coverage value for each pixel for the selected clipping path; and
drawing at least one object by using a stencil test to identify pixels whose current stencil value in the non-multisampled stencil buffer is equal to a count of the selected clipping path, and multiplying a color value for each identified pixel by the texture value in the non-multisampled texture corresponding to each identified pixel.

7. The one or more computer storage media of claim 6, wherein the operations further comprise creating a non-multisampled frame buffer, the non-multisampled stencil buffer, and the non-multisampled texture.

8. The one or more computer storage media of claim 6, wherein the operations further comprise initializing the stencil values in the non-multisampled stencil buffer with all zeros.

9. The one or more computer storage media of claim 6, wherein the operations further comprise initializing the texture values in the non-multisampled texture with all ones.

10. The one or more computer storage media of claim 6, wherein the operations further comprise processing a first clipping path by:
incrementing the stencil value in the non-multisampled stencil buffer for each pixel covered at least partially by an area defined by the first clipping path;
determining a clipping path coverage value for each pixel for the first clipping path; and
storing the clipping path coverage value for each pixel for the first clipping path as the texture value for each pixel in the non-multisampled texture.

11. The one or more computer storage media of claim 10, wherein storing the clipping path coverage value for each pixel for the first clipping path in the non-multisampled texture comprises overwriting the texture value for each pixel in the non-multisampled texture with the clipping path coverage value for each pixel for the first clipping path.

12. The one or more computer storage media of claim 6, wherein the operations further comprise tessellating the current clipping path into triangles and writing the triangles into a non-multisampled frame buffer.

13. The one or more computer storage media of claim 6, wherein drawing the at least one object includes restoring a color buffer as an output color attachment for a non-multisampled frame buffer.

14. The one or more computer storage media of claim 6, wherein the operations further comprise uninstalling the plurality of clipping paths by:
successively performing for each clipping path starting with a last clipping path processed:
selecting a current clipping path to uninstall;
setting the non-multisampled texture as the output color attachment for a non-multisampled frame buffer;
tessellating the current clipping path to uninstall into triangles and writing the triangles to the non-multisampled frame buffer;

decrementing the stencil value in the non-multisampled stencil buffer for each pixel covered at least partially by an area defined by the current clipping path to uninstall;

determining a clipping path coverage value for each pixel for the current clipping path to uninstall; and dividing the texture value in the non-multisampled texture by the clipping path coverage value for each pixel.

15. The one or more computer storage media of claim 14, wherein dividing the current value in the non-multisampled texture by the clipping path coverage value for each pixel comprises:

computing a reciprocal of the clipping path coverage value for each pixel in a fragment shader; and multiplying the texture value in the non-multisampled texture with the reciprocal value for each pixel.

16. A computer-implemented method for anti-aliased rendering of an object clipped from an input object using a plurality of clipping paths, the method comprising:

successively processing at least a portion of the clipping paths by:

selecting a current clipping path;

setting a non-multisampled texture as a current texture;

setting the current texture as an output color attachment for a non-multisampled frame buffer;

determining a clipping path coverage value for each pixel for the current clipping path;

storing the clipping path coverage value for each pixel in the current texture;

computing a resulting value for each pixel by multiplying the clipping path coverage value for each pixel in the current texture with a value for each pixel stored in a previous texture from processing one or more previous clipping paths;

storing the resulting value for each pixel in the current texture; and drawing the object by multiplying a color value for each pixel by a respective value in the current texture.

17. The method of claim 16, wherein the method further comprises initializing the current texture with all zeroes.

18. The method of claim 16, wherein the method further comprises tessellating the current clipping path into triangles and writing the triangles into the non-multisampled frame buffer.

19. The method of claim 16, wherein the method further comprises deleting the previous texture.

20. The method of claim 16, wherein drawing the object includes restoring a color buffer as the output color attachment for the non-multisampled frame buffer.

\* \* \* \* \*